United States Patent
Leach

[15] 3,678,833
[45] July 25, 1972

[54] COMPRESSED PARALLAX PHOTOGRAPHY

[72] Inventor: Sam L. Leach, Palos Verdes Peninsula, Calif.
[73] Assignee: Pid Corporation, Beverly Hills, Calif.
[22] Filed: April 17, 1968
[21] Appl. No.: 721,984

[52] U.S. Cl. ..............................................95/18
[51] Int. Cl. ......................................G03b 35/10
[58] Field of Search ..................95/18, 18 P; 352/67

[56] References Cited

UNITED STATES PATENTS

| | | | |
|---|---|---|---|
| 1,260,682 | 3/1918 | Kanolt | 95/18 X |
| 1,347,794 | 7/1920 | Saalburg | 95/18 X |
| 1,977,310 | 10/1934 | Kanolt | 95/18 X |
| 2,566,110 | 8/1951 | Backus | 95/18 |
| 1,817,963 | 8/1931 | Capstaff | 352/67 |
| 1,851,705 | 3/1932 | Herz | 95/18 X |
| 2,508,487 | 5/1950 | Bonnet | 95/18 P |
| 3,037,441 | 6/1962 | Leach | 95/18 P |
| 3,301,154 | 1/1967 | Stewart | 95/18 P |
| 3,380,360 | 4/1968 | Stockbridge | 95/18 |

*Primary Examiner*—John M. Horan
*Attorney*—Jacobi, Davidson, Lilling & Siegel

[57] ABSTRACT

A method and apparatus is disclosed which utilizes a novel compressed parallax photographic technique to create pictorial parallax panoramagrams having an illusion of depth. A traversing camera having an objective lens means and an optically transparent lenticular screen disposed above the film is caused to traverse an arcuate path about the object to be photographed. The arcuate excursion distance is greatly enlarged over the distances utilized in prior art techniques and the camera, rather than continuously photographing the object throughout the arcuate excursion, photographs the object only at sampled locations along its arc of excursion. The film in the camera is advanced only when the camera is taking a photographic sample. The inventive technique is such that a much greater degree of parallax can be obtained without any loss of resolution and fidelity of the photographic image.

8 Claims, 11 Drawing Figures

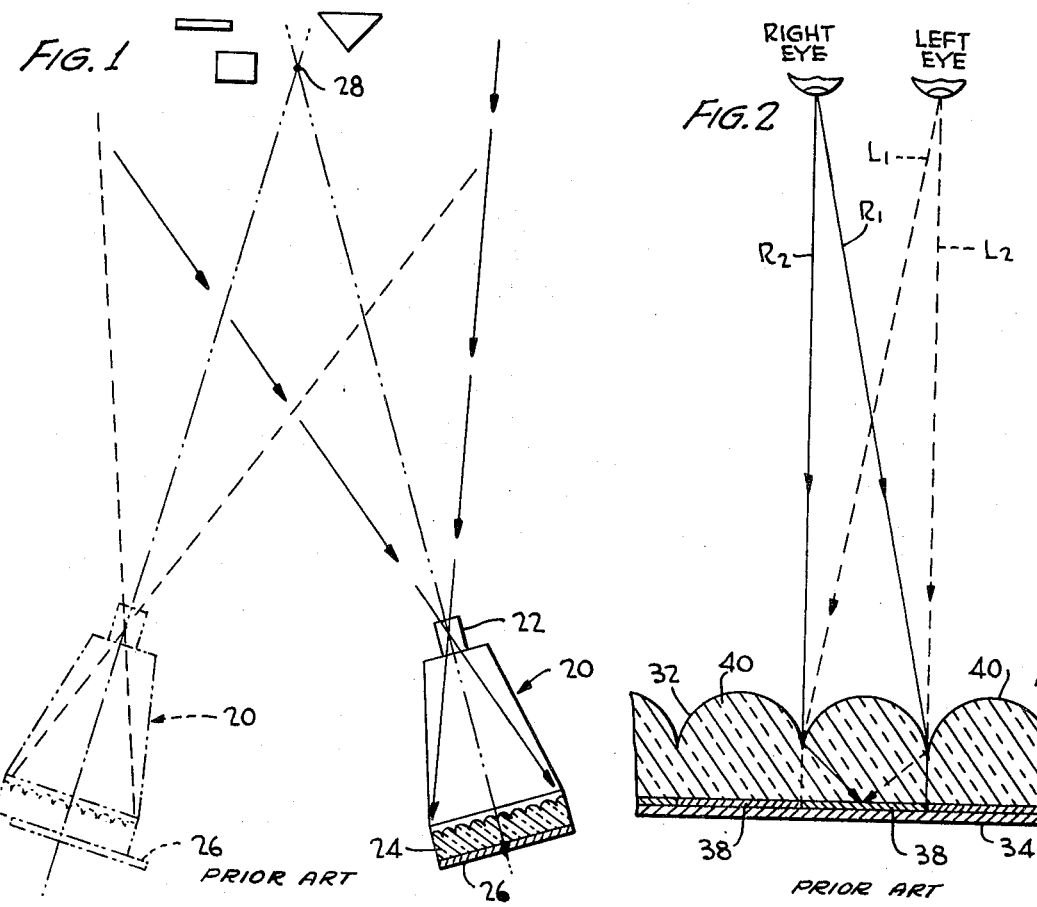
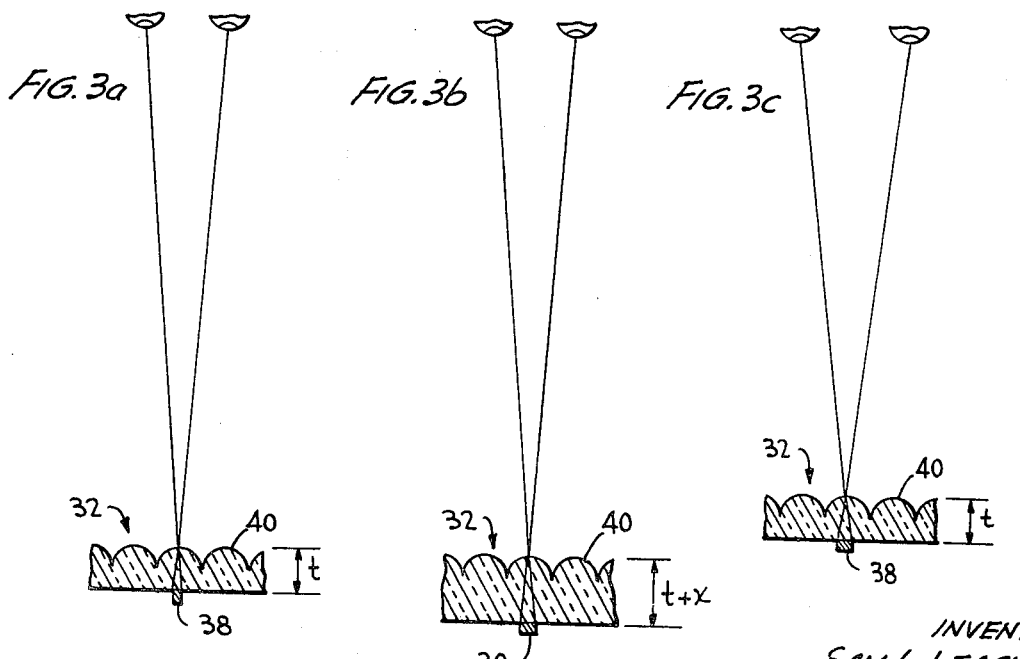

PATENTED JUL 25 1972 3,678,833

INVENTOR,
SAM L. LEACH
BY Jacobi and Davidson
ATTORNEYS

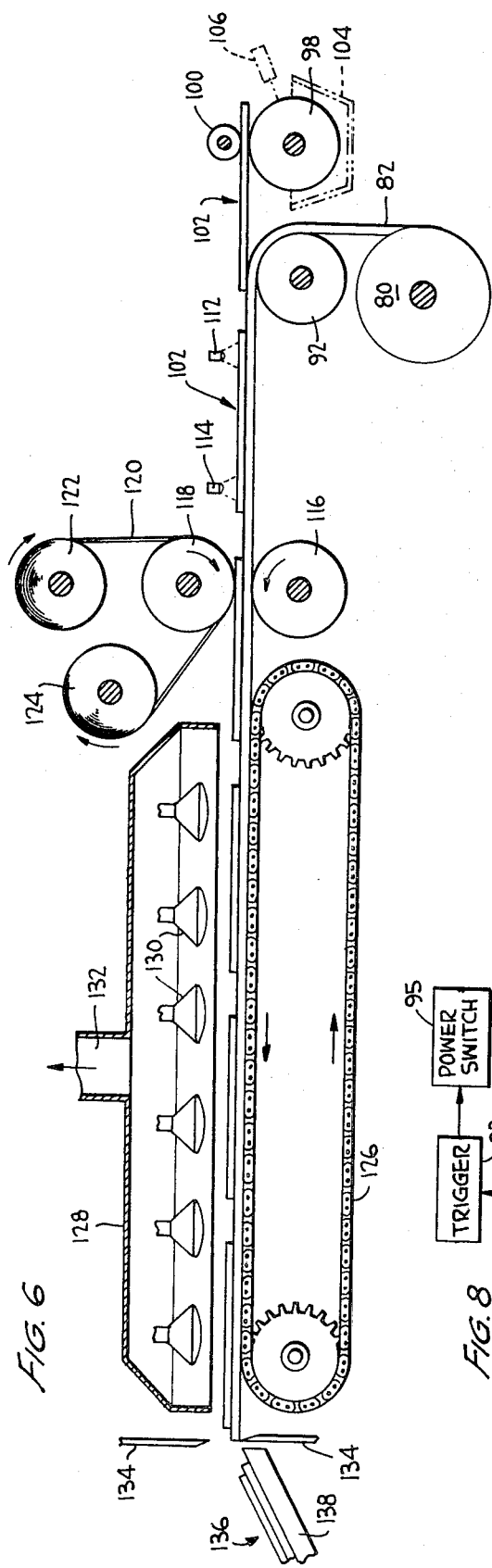
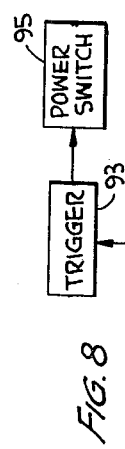
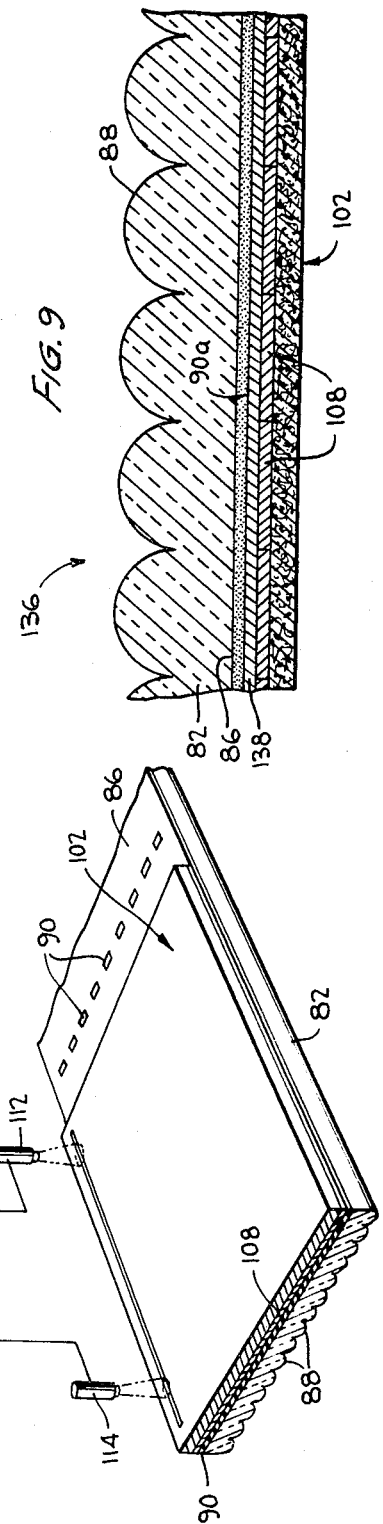

COMPRESSED PARALLAX PHOTOGRAPHY

This invention generally relates to photography and specifically contemplates a novel compressed parallax photographic technique for photographically creating pictorial parallax panoramagrams or three-dimensional units. The subject invention further contemplates the provision of a technique of providing a finished three-dimensional unit which utilizes a novel lamination process wherein a lenticular screen having a micro-encapsulated adhesive backing is automatically aligned and affixed to the image reproduction obtained from the compressed parallax photographic technique.

There are certain known techniques utilized for photographically creating items generally known as "pictorial parallax panoramagrams", sometimes referred to as "3-D units". A finished unit of this type normally includes a backing layer having a series of lineations thereon and an overlying lenticular screen unit, the outermost surface of which is formed with a series of elongated, generally parallel lenses or lenticles. The picture or image information is arranged in the lineations on the backing layer with such lineations being aligned in parallelism with the lenses or lenticles of the lenticular screen. When an observer looks at the picture or unit through the lenses or lenticles of the lenticular screen unit, an illusion is created. If the lineated image is comprised of camera "views" achieved from different positions, predetermined to provide parallax, an illusion of depth is created thereby giving the observer a 3-D effect.

Alternatively, if the lineated image information is comprised of camera "views" achieved from a single position which cannot introduce parallax, the observer is given a "changeable picture" illusion when the picture is moved or when the observer moves with respect to the observed picture. Units of this general type, techniques for creating the lineated image layer, and processes of assembling the finished product of the lineated image layer and the overlying lenticular screen unit, are described in some detail in my prior U.S. Pat. No. 3,037,441, issued June 5, 1962, and in U.S. Pat. No. 3,241,429, issued Mar. 22, 1966, for example.

The basic photographic c techniques for creating the lineated image layer which forms a portion of the pictorial parallax panoramagram unit are known in the art. Generally, a camera unit is provided that physically moves through an arcuate path or excursion of predetermined duration and/or distance about the object to be photographed during the actual exposure. A lenticular lens is normally provided behind the objective lens of the camera and in overlying relationship to the film. Since the lenticular lens continually re-focuses the object image fed to it through the objective lens of the camera, and since the lenticular lens has power only in one direction, the lenticular lens will accordingly serve to re-focus the image information it receives to a thin line on the underlying film. The film itself is normally continuously moved during the exposure simultaneously to and in synchronism with the camera movement or excursion, the direction of the film movement normally being in opposite direction to the direction of movement of the camera.

Through the entire excursion of the camera and regardless of the excursion distance, the film movement is confined to precisely the width of a single lenticular lens element of the lenticular lens unit. Naturally, the camera movement itself is limited to an amount or distance of travel or excursion which will not feed more image information into the optical system comprising the lenticular lens unit and the underlying film than can be adequately resolved by the lens-film combination. The image recorded on the underlying film by a 3-D camera as thus a continuously swept image containing image information of the target object equivalent to a multiplicity of images each of which corresponds to what the camera viewed during each instantaneous position along its entire path of arcuate travel, this path being known as the "parallax".

With 3-D photography, the amount of parallax recorded on the film and thus the distance of arcuate travel of the camera about the object to be photographed is directly related to the amount of illusionary depth seen by an observer of the final pictorial parallax panoramagram unit. Specifically, the longer the arcuate path of travel, the greater the amount of parallax recorded and thus the greater the illusory depth. Difficulties have arisen with these prior art techniques when lengthening of the arcuate path of travel of the camera was attempted. Since, with the prior art techniques, exposure of the film takes place continuously throughout the arcuate path of travel of the camera, all of the image information delivered to the camera must be confined to the limited film area lying beneath and swept by the individual lenticular elements of the lens unit. Thus, as the arcuate path of the 3-D camera is lengthened, more and more image information must be confined to this rather limited area of film, this amount of information to which the camera as a whole can respond to being, of course, limited by the resolution of the lenticular lens and film combination. If this limit is exceeded by lengthening the arcuate path of travel of the camera to any great extent, the image information recorded on the film would comprise double exposed and stacked information containing much "crosstalk", which obviously would ruin the quality of the 3-D picture.

Accordingly, the prior art 3-D photographic techniques are not entirely satisfactory due to their inherent limitations on the length of the arcuate travel of the 3-D camera and thus, the limitation on the amount of illusory depth observed by the viewer of a completed 3-D unit produced in accordance with the prior art techniques. A need exists in the art for a 3-D photographic technique which can create a pictorial parallax panoramagram unit which has a far more pronounced illusory depth effect to a viewer thereof, yet can create this pronounced depth effect without sacrificing clarity and quality of the image. It is therefore a primary object of the subject invention to provide a photographic technique which will satisfy this need. A further though equally important object of the subject invention is to provide a novel method and apparatus for assembling a finished pictorial parallax panoramagram unit after the image information has been recorded thereon.

Other and more specific objects of the subject invention are as follows:

a. To provide a 3-D photographic technique wherein the excursion path of the 3-D camera and thus the parallax recorded is far greater than heretofore possible without sacrificing quality and resolution of the recorded image;

b. To provide a photographic technique which lends itself to the satisfactory commercial production of pictorial parallax panoramagram units;

c. To provide a photographic technique and manufacturing process which produces a finished 3-D unit of superior quality than similar units of the prior art and at a lower unit cost;

d. To provide a manufacturing and assembly process for pictorial parallax panoramagram units which utilizes an extremely thin and flexible lenticular screen, the finished unit being suitable for use in a variety of applications;

e. To provide a novel manufacturing method and apparatus for assembling 3-D units at a much faster rate than heretofore possible;

f. To provide a method and apparatus for producing finished 3-D units which is substantially automatic in operation.

These and other objects and advantages are implemented by the subject invention in that there is contemplated the provision of a compressed parallax photography technique wherein the 3-D camera utilized moves through a greatly expanded and lengthened arcuate excursiOn path about the object to be photographed. As the camera moves along the lengthened arcuate path, exposures of the object are effected only during certain sampling periods and then focused on film underlying a lenticular lens arrangement, which film is periodically moved during the exposure samples, the total distance of movement of the film throughout the camera's entire arcuate excursion being not greater than the width of one lenticular lens element. Through this novel sampling technique coupled with the extended arcuate excursion path of the camera, far greater parallax can be recorded on the camera film than heretofore possible without overexposure or overlap of the images formed on the film.

The recorded image is then printed on backing plates or sheets and is joined with an overlying lenticular screen in a novel manner to form the finished pictorial parallax panoramagram unit. Specifically, the invention contemplates, in a preferred form thereof, the provision of a continuous web of thin, lenticular screen material, one side of the continuous web of lenticular screen material having a micro-encapsulated adhesive affixed thereto. A novel apparatus is provided which serves to automatically align the printed images on the backing plates or sheets with the continuous web of material comprising the lenticular lens and in juxtaposition therewith. The lenticular lens and backing plate or sheet upon which the image is printed or otherwise formed is then passed between a pair of rollers comprising a pressure nip wherein the micro-encapsulated adhesive between the backing plate or sheet and the lenticular screen is activated, to form the bonding layer which bonds the web or screen to the backing plate or sheet to thus form a resultant pictorial parallax panoramagram.

The invention itself as well as specific advantageous features thereof will be more clearly understood when reference is given to the following detailed description of preferred embodiments thereof, such description making reference to the appended drawings wherein:

FIG. 1 is a schematic representation of a 3–D photographic technique;

FIG. 2 is an elevational view, partially broken away, of a typical pictorial parallax panoramagram unit illustrating the principles of illusory depth perception;

FIGS. 3a and 3b are elevational views, partially broken away, of simple lenticular lens structures of different thicknesses, illustrating the amount of parallax observed by the viewer thereof and FIG. 3c is a similar view of a lenticular lens structure having the same thickness as FIG. 3a wherein the observer is capable of seeing more parallax;

FIG. 6 is an elevational view illustrating a preferred embodiment of the inventive apparatus for laminating lineated pictures formed on a backing plate or sheet to a lenticular screen;

FIG. 8 is a perspective view, partially broken away for illustrative clarity, depicting an alignment monitoring step performed in the novel assembly process of the subject invention; and, FIG. 9 is a cross-section, partially broken away, of a finished pictorial parallax panoramagram unit constructed in accordance with the techniques of the subject invention.

Figure 4:
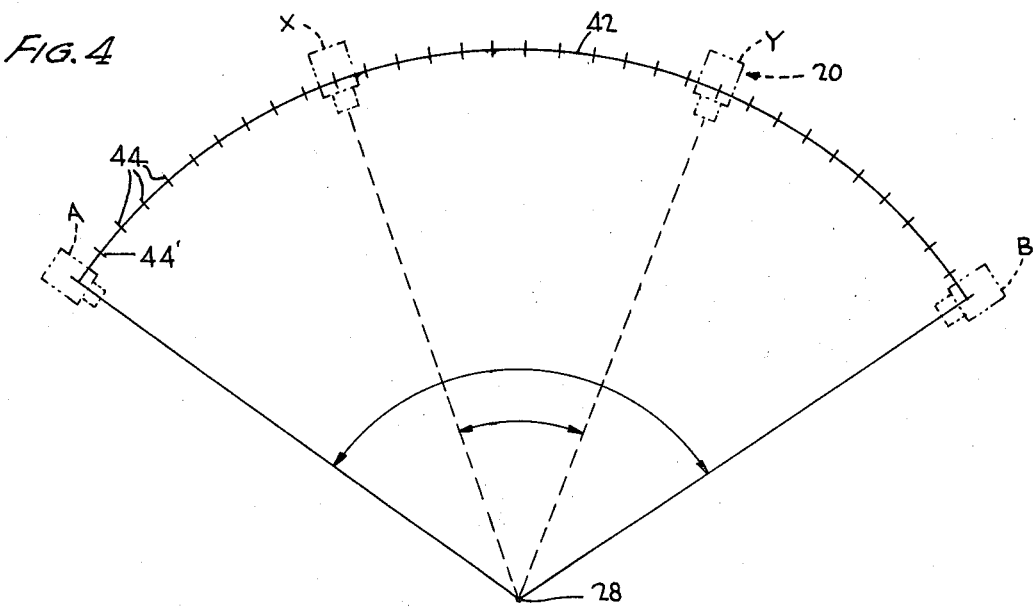
FIG. 4 is a schematic diagram illustrating the principles of the novel compressed parallax photography of the subject invention.

Referring now to the drawings and particularly to FIG. 1 thereof, a basic, prior art photographic technique for creating the lineated image layer of a 3–D pictorial parallax panoramagram unit is shown. A traversing camera generally designated 20 is indicated. This camera includes an objective lens means 22, an optically transparent lenticular screen 24 whose lenticles are directed toward the objective lens, and the film 26 which is disposed behind the lenticular screen 24. Suitable operating means, not illustrated, is provided for the purpose of moving the camera 20 through an arcuate path of motion, the distance of movement along this path and speed of movement all being properly predetermined. This camera movement is known in the art as the "excursion" of the camera. Means are also provided for creating a relative movement within the camera itself between the film 26 and the lenticular screen 24 thereof. This movement operates in synchronism with the excursion of the camera and is known in the art as the "push". The "push" and the "excursion" operate not only in synchronism, but in directions opposite to each other.

With continuing reference to FIG. 1, it will be seen that the "excursion" of camera 20 is from its solid line or right-hand position to a dotted line or left-hand position. The "push" between the film 26 and the screen 24 is from left to right, as can be evidenced by observation of the relative position of the film and screen in the left-hand or dotted line position of the camera 20. As aforementioned, this synchronous operation of the "push" and "excursion" movement of the camera is known in the art and need not be discussed in any great detail herein. It should be of interest, however, to note exactly what happens during this type of camera movement. The particular image or information seen by the camera 20 at any instant in time is focused by the objective lens means 22 onto the lenses of the lenticular screen 24 within the camera. Each lens of the lenticular screen then, in turn, focuses the received information onto the superposed film 26 so that, at any instant, the image information is fed to the film in a series of very thin lines arranged behind the lenses of the lenticular screen 24. As the camera moves through its excursion, it will view or look at the particular scene comprising the target object from a variety of different positions and this different image information will be fed back in a focused manner to the lenticular screen which, in turn, re-focuses the information on the film. However, as the camera is moving through its excursion, the film and screen are moving relatively to one another in an opposite direction, thus creating the aforementioned "push". Regardless the time or the extent of the "excursion", it is critical that the "push" be confined to the width of exactly one lenticle of the screen during the excursion. In other words, with reference to FIG. 1, if it is assumed that the entire excursion of the camera is from the solid line or right-hand position to the dotted line or left-hand position, by the time that the camera 20 reaches its dotted line or left-hand position, the film 26 will have moved relative to the screen 24 by a distance equal to the width of one lenticle of the screen 24.

As a result of this counter-acting "excursion" and "push" motion, the image as finally recorded on the film 26 is a continuously swept image containing information representing what the camera viewed or saw at each position of its motion through the distance of its excursion. In FIG. 1, for simplicity, there are shown a triangle, a rectangle and a square, and it can be assumed that these objects are the particular items of information which are being recorded by the camera. There is, of course, a pivot point or point of rotation of the camera about which the excursion path is defined. This pivot point or point of rotation is designated 28 and, of course, such point will always be equidistant from the camera. However, any object which is not at this exact point will be seen differently by the camera during the different positions thereof along its excursion path. Considering the triangle, for example, when the camera is in its solid or right-hand position of FIG. 1, the triangle would appear relatively close thereto. On the other hand, however, by the time that the camera has swung around to its left-hand or dotted line position, the triangle will be spaced further away therefrom. On the film itself, there will be a series of separated lineated image means comprising the information seen by the camera. In the illustrated embodiment of FIG. 1, there are eight lenticles on the screen 24 and accordingly, there would be eight separate lineated image strips along the film 26. This number, of course, is reduced for purposes of simplicity in illustration, and in actual practice, a typical screen 24 might contain several hundred or perhaps as many as several thousand individual lenticles and accordingly, there will be a corresponding number of image information strips on the film. Each of the film strips or lineations will contain exactly the same information, which information will be a continuously swept photograph of the scene as the camera shutter is open throughout the entire excursion of the camera. While each particular information strip or lineation on the film contains the entire photograph, the point of time and hence the view of the scene will be varied from strip to strip.

Attention is now directed to FIG. 2 for an understanding of how the foregoing principles and techniques are utilized in a final product. A fragmentary portion of a pictorial parallax panoramagram comprising the final product is shown in an ideal condition in FIG. 2. Such a final product is generally designated 30 and is seen to include a lenticular screen generally designated 32 and a backing layer means 34 which includes as a portion thereof an image meanS generally designated 36. The image includes a plurality of lineations or strips 38, each one preferably disposed behind a lenticle 40 of the lenticular screen 32. Each of the individual image strips or panels 38 comprises, across the width thereof, a continuous series of changing indivisible line images which correspond, of course, with the lineated image means formed on the film 26 during the aforementioned photographic technique. When all of the panels or strips 38 are arranged in contiguous end-to-end arrangement, they make up a continuous picture corresponding to the picture formed on the film 26 but varying in point of view depending upon the particular momentary disposition of the camera at the time that the particular line images were photographed. With the understanding that the unit 30 shown in FIG. 2 is operating under ideal conditions, an observer's left eye receives the rays L1 and L2 which emanate or reflect from one portion of the strip 38 while the observer's right eye receives the rays R1 and R2 which reflect or emanate from the other portion of the strip 38. Each lenticular lens element would magnify and collimate the image formed on the strip 38 lying beneath the full width of that lenticle. Only two points lying under one lenticular lens element have been described for purposes of clarity. Naturally, each of the lenticular lens elements operates in a similar fashion and the resultant effect to the observer is that of the accumulation of the information collimated by the total number of lenticular lens elements. As is apparent, however, the observer would be given the same visual effect as if he was viewing a stereoscopic slide through a stereoscope. That is, separate images of the same picture, differing only in point of view, are received simultaneously by the observer's eyes, and are subconsciously merged by his brain to create, through sensory perception, the illusion of depth or three dimensions.

As aforementioned, the description of operation discussed with respect to FIG. 2 occurs under ideal conditions and is not one which occurs in actual practice utilizing an actual panoramagram unit 30. Instead, attention should be directed to FIG. 3 and the three views A, B and C thereof. In view A, the screen 32 is depicted as comprising a thickness t and the observer's eyes are viewing only a small portion of the information contained on the strip 38 behind the lenticle 40. In other words, the observer is seeing only a small amount of parallax and, accordingly, the illusion of depth will not appear very great or deep to the observer. In FIG. 3B, the thickness of the screen 32 is increased to a thickness measuring $t+x$ thereby increasing the focal length of each individual lenticle 40. Utilizing such an expedient, the observer would view a considerably greater portion of the image information along the strip 38 as shown, and accordingly, would see an increased amount of parallax and thus a greater illusion of depth. Obviously, it is more expensive and less desirable for a variety of reasons to form a screen of the increased thickness shown In FIG. 3B so as to obtain a greater amount of parallax as viewed by the observer. Naturally, it would be and is desirable to create the condition depicted in FIG. 3C, wherein the screen 32 is still of the thickness $t$, but wherein the observer is capable of seeing more parallax and hence has the allusion of greater depth. Stated in another way, the units of FIG. 3A and FIG. 3C should have the same physical dimensions and other physical characteristics, yet while the observer sees only about 20 percent of the available parallax in FIG. 3A, the present invention provides an arrangement functionally equivalent to that of FIG. 3C, wherein a 3-D unit is provided which utilizes a screen 32 having no increase in thickness yet wherein the observer sees about 40 percent of the total available parallax. This increase in available parallax viewed by the observer and thus the increase in the illusory depth so perceived is accomplished through the utilization of the "compressed" parallax photographic techniques described herein.

Basically, the "compressed parallax photography" in accordance with the principles of the present invention utilizes a camera excursion which is greatly enlarged and is, in fact, twice or more the normal arcuate excursion distance of the prior art 3-D cameras. However, whereas in the conventional photographic techniques, the camera photographs continuously as it moves through its arcuate excursion, in the present invention of "compressed parallax photography", the camera takes pictures only at "sampled" locations along its increased arc of excursion. This "sampling" is such that a much greater degree of parallax can be obtained without losing any resolution and fidelity during the photographic technique and without superimposing any photographic image material one layer upon the other as would be the case if the arcuate excursion distance of the prior art 3-D cameras were extended. Stated in another way, utilizing the prior art techniques, the camera might have moved through an excursion of 30° with the camera shutter being open throughout the entire arcuate excursion path, thereby creating a continuous "taking" of the picture. In direct contrast thereto, utilizing the present invention, the camera can move through an excursion path of perhaps 60° or more, but the shutter is opened and closed only at selective locations along the entire arcuate path. Thus, with the present invention, the "taking" of the picture is not continuous, but instead, is intermittent at selected spaced intervals along the extended arcuate excursion path.

The principles of the present invention and their comparison with knOwn techniques can best be understood by reference to FIG. 4. In FIG. 4, as in FIG. 1, the traversing camera itself is generally designated 20 and such traversing camera swings about an axis of rotation or pivotal point 28. Hence, the camera 20 is movable through an arcuate excursion path which is designated 42. In known or prior art techniques, camera 20 would move through an excursion from X to Y, for example, or conversely thereof, and during this arcuate path of travel, the shutter of the camera would be continuously open and thus, the camera itself would be continuously "taking" the photograph. With a rather limited excursion path such as shown between X and Y, the prior art techniques can produce a suitable image yet, as mentioned above, the amount of parallax and thus the perception of illusory depth is quite limited. To provide greater parallax and thus greater illusory depth, the camera 20 should swing through a greater excursion path. Yet, the prior art photographic techniques are not capable of providing a greater excursion path and thus a greater illusory depth perception. The reason for this limitation is that the film area behind a single lenticular element of the lenticular screen normally has a width of only a few thousanths of an inch. Naturally, the image information which can be recorded in such a limited area is minimal and, as should be apparent, any attempt to place more image information into the same confined area would only result in "cross-talk" between the images, overlapping and/or double-exposure thereof or otherwise improperly exposed images not having a quality resolution. Briefly stated, since the film area available for the swept image behind each lenticular lens is capable of absorbing only a finite number of images, any attempt to introduce additional parallax by introducing additional images utilizing the prior art technique wherein the camera shutter is continually open during the entire excursion path, would result in an extremely poor recorded image.

In contrast, with the prior art techniques, the present invention contemplates the provision of such an extended arcuate excursion path to thus create more parallax and greater illusory depth but without sacrificing image quality. For example, the arcuate excursion path of the camera 20 when utilizing the techniques of the subject invention can extend from A to B, or conversely thereof. As the camera 20 moves along this extended arcuate excursion path, photographs of the object are not taken continuously, but instead, such photographs are taken only at selected or "sampled" intervals along the excursion path, such intervals being designated in the drawing of FIG. 4 by numeral 44. Assuming that the direction of camera excursion was from A to B, the camera would "take" its first view of the target scene at point A. Then, the camera shutter would close until the camera reached the point designated 44' along the excursion path whereat the camera shutter would again open and the camera would "take" another photograph of the target scene, this time from a slightly different location. Then, the camera shutter would close again until the camera reached its next station or index point 44 along the excursion path whereupon the shutter would again open and the camera would again "take" a picture of the scene. Thus, although the camera itself would move continuously from points A to B along the excursion path, the camera shutter would be open only intermittently at selected or "sampled" locations along the arcuate path of travel. As a result, a much greater amount of "parallax" can be compressed into the lineated information strips appearing behind each lenticle on the lenticular screen 24 of the camera, yet, the total amount of information contained within the lineated information strip is not such as to "overfill" the same and thus cause a poor quality image.

Figure 5:
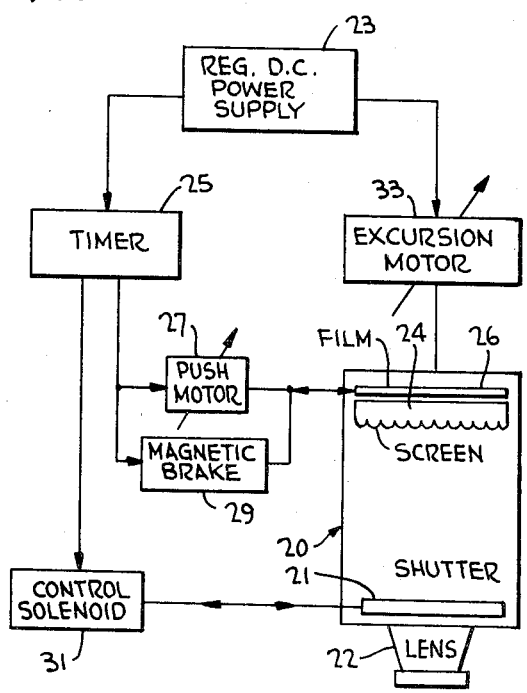
FIG. 5 is a schematic diagram of a 3–D camera and novel circuitry associated therewith effecting the compressed parallax photographic technique of the subject invention.

For a broad understanding of how the compressed parallax photographic technique explained in FIG. 4 is accomplished, attention is now directed to the block diagramsschematically shown in FIG. 5 wherein a 3-D camera is depicted, the camera being operated by novel electronic control circuitry effecting the compressed parallax technique. In such Figure, a suitable source of power, preferably from an AC line, comprises the input to a regulated DC power supply 23 which converts the AC input into a regulated and controllable DC output in known manner. One output from the regulated DC power supply 23 is fed to a variable and controllable excursion motor 33 which drives the camera 20 along its arcuate excursion path. The length of the arcuate excursion path as well as the length of time during which such excursion is accomplished can be varied by suitable control of the variable speed excursion motor 33 and of the magnitude of the DC output from the power supply 23.

As previously indicated, the "push", that is the movement of the camera film 26, must be correlated in synchronism with the excursion of the camera 20 and, hence, the regulated power supply 23 provides controllable power for the camera "push" as well. As is depicted in FIG. 5, an output from the regulated DC power supply 23 is further applied to a timer means or mechanism 25 which, in turn, controls the variable speed push motor 27 effecting movement or push of the film 26 relative to the lenticular screen 24. As aforementioned, the "push" is accomplished by moving the film 26 relative to the screen 24 so that during the course of one entire arcuate excursion of the camera 20, the film 26 is moved across the screen 24 by a distance corresponding to the width of only one lenticle on the screen. A magnetic brake 29, which preferably comprises a switchable resistive shunt across the push motor 27, serves to quickly and forceably stop the push motor 27 whenever power is not applied thereto through the timer 25. This braking action is, of course, produced by a back EMF since, further rotation of the variable drive push motor 27 in the absence of power applied thereto through timer 25, would cause the push motor 27 to momentarily function as a generator. As is shown, power is also applied through the timer 25 to a control solenoid 31 which, in turn, is connected with the shutter generally designated 21 of the traversing camera 20 to control the opening and closing of the same.

The timer means or mechanism 25 preferably comprises known electronic timing or counting circuits such as are commercially available under the name of Intermatic, Series SS-10. As a practical matter, the circuit of FIG. 5 operates broadly, after the power supply 23 has been properly pre-set, to correlate the operation of the push motor 27 with the control solenoid 31 as well as with the excursion motor 33. Throughout the excursion path of the camera 20, the timer means 25 would produce a series of spaced, logic pulses having a controllable time duration to both the push motor 27 and the control solenoid 31. Thus, at selected intervals or during selected "sampling" periods of the entire excursion path of camera 20, the control solenoid 31 would serve to open the shutter 21 of camera 20 during controllable, spaced time intervals and, whenever the shutter 21 is open, the variable drive push motor 27 would also operate to advance the film 26 a small, controllable distance. Thus, the camera arrangement of FIG. 5 provides a much longer excursion path and thus much greater parallax than camera arrangements of the prior art and, in so doing, does not impair the quality of the recorded image since, during the extend excursion path, the camera periodically "samples" or takes photographs of the target object.

Thus, with the arrangements above discussed, a lineated photograph of the target object will thus be produced containing a great amount of parallax and high quality resolution. At this stage, the lineated photograph taken by the camera must be converted into the final pictorial parallax panoramagram unit. Assuming that the negative of the 0.03125 taken by the traversing camera is in color, it is necessary to initially subject such negative to a color separation operation so as to obtain a series of separate black and white film records. Color separation is a technique well known in the photographic art and a detailed discussion thereof is thus unnecessary to an understanding of the subject invention. Basically, the color separation contemplates the use of subtractive filters which are magenta, cyan, and green. As is known, each of these color separation filters will absorb light having a frequency comprising their respective colors, and, as a result of the utilization of these subtractive color filters, four black and white film records can be obtained, the density of each of the black and white film records representing information concerning blue, green, red, and black colors absorbed by the photograph taken by the traversing camera. Commercial color separating techniques, such as silver masking, can be used for this purpose, and a gray scale can be provided to vary the proper intensity on the individual black and white film records.

Each of the four black and white film records is then screened by well known graphic techniques to break the image into a series of dots having varying intensities. Reference is herein made to a booklet entitled "Basic Color For the Graphic Arts" Eastman-Kodak Company, 1964, for a detailed description of color techniques. Thereafter, the screened pictures are preferably utilized to form four gravure printing cylinders with small pits in the cylinders corresponding to the arrangement of dots on the screened pictures. Then, the process is advanced to the printing stage and the four gravure cylinders are placed in a multi-color press so that the picture itself can be printed in successive passes. The "yellow" gravure cylinder picks up yellow ink from a reservoir and after the ink has been wiped off the surface of the cylinder by a doctor blade, the yellow ink will remain only in the pits in the surface of the cylinder. As the web or sheet is fed into contact with the yellow gravure cylinder, the ink is transferred from the pits therein onto the surface of the sheet to form a print comprising a series of yellow dots. The same procedure is followed with respect to the magenta cylinder, the cyan cylinder and the black cylinder. As a result, in four successive runs, all four colors have been printed onto the final picture and a reproduction has been made of the photograph taken by the 3-D camera. Obviously, other printing techniques such as lithography, letterpress and the like, could also be used.

Of course, it will be appreciated that the traversing camera of the subject invention can also take a simple black and white photograph. In such event, there is no need to resort to the aforementioned color separation techniques. Instead, the negative from the traversing camera is itself black and white and is screened to form a series of dots. The screened picture is then used to form the series of pits in a gravure cylinder, for example, and black ink is utilized to form a black dot picture on the final sheet. In either instance, namely, whether the final picture is a black and white picture or a color picture, it will be understood and appreciated that the image appearing thereon will be a lineated image similar to the lineated image formed initially on the film 26 in the camera 20, although the size of this final picture may be enlarged or reduced, as desired. Then, as is conventional, a varnish coating would be applied over the lineated image strips to protect the inks and to prevent any adhesive coating from directly penetrating the same.

Figure 7:
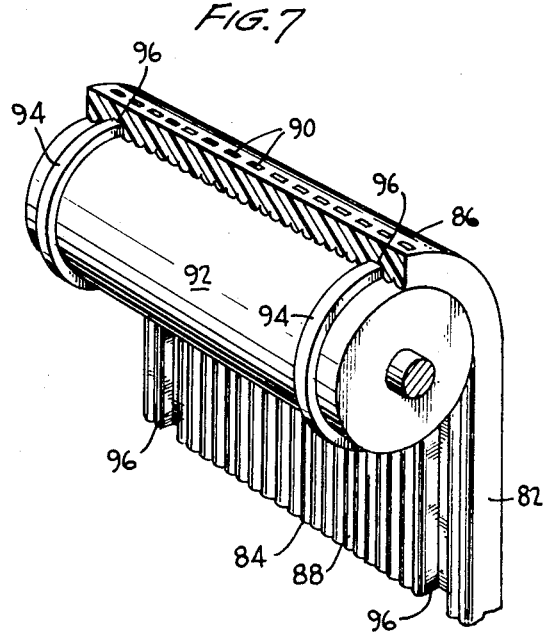
FIG. 7 is a perspective view, partially in cross-section of one of the rollers comprising the inventive laminating apparatus.

Referring now to FIGS. 6–8, such figures illustrate the novel manner in which the lineated pictures which have been formed by the aforementioned processing techniques can be laminated to the lenticular screen means to form a final finished pictorial parallax panoramagram unit. The lenticular screen itself is supplied in the form of a roll generally designated 20 which is convolutely wound with the lenticles thereon facing inwardly. The web itself is designated 82 and is formed of a plastic material which is preferably manufactured to a suitable width and thickness. The width, of course, can be varied as desired, and the thickness of the web, in accordance with the present invention is between 0.003 and 0.100 inches, with a thickness of 0.008 inches being preferred. The material from which the web 82 is fabricated in accordance with the subject invention preferably has a specific gravity of between 1.04 and 1.45 as determined in accordance with ASTM standard test method No. D792, a refractive index of between 1.52 and 1.60 as determined in accordance with ASTM standard test No. D542, a modulus of elasticity of between 3.5 and $6 \times 10^5$ psi in accordance with ASTM standard No. D747, a flexural strength of between 8,700 and 16,000 psi as determined in accordance with ASTM standard test No. D790, and has suitable optical clarity and transparency to permit visual observation throughout the thickness thereof. One suitable material in accordance with the aforementioned characteristics is polystyrene, although vinyl chloride or polyvinyl chloride might also be used.

The web 82 which is fabricated from the aforementioned materials is provided with a front surface 84 and an opposed rear surface 86. Along the front surface 84, a series of elongated parallel lenses or lenticles 88 are formed. Each lenticle 88 preferably has a width of between 0.003 inches and 0.03125 inches and the radius of curvature of each individual lenticle 88 is correlated with the thickness of the web 82 so that each lenticle focuses substantially at the rear surface 86 of the web. As mentioned above, the thickness of the web 82 is between 0.003 inches and 0.100 inches, with a thickness of 0.008 inches being preferred.

In accordance with a further novel feature of the subject invention, and in a preferred embodiment thereof, the rear surface 86 of the web 82 is coated, at the time that the web is manufactured, with a micro-encapsulated adhesive means. This adhesive means is preferably an acrylic polymer which is encapsulated in micron sized spheres of suitable material. Also, the capsules can be formed of suitable vinyl cement materials, if desired, but in any event, the micro-encapsulated adhesive is designated as 90 in FIG. 7, and is of the type which can be activated through the application of pressure. As should be appreciated, the coating of the web 82 with the micro-encapsulated adhesive means allows the web 82 comprising the elongated lenticles 88 to be stored until the desired time of manufacture of the finished 3–D unit, at which time, the micro-encapsulated adhesive is activated through the application of pressure. Accordingly, utilizing this novel feature of the subject invention, eliminates the necessity of providing separate adhesive or cement materials at the time of manufacture.

As can best be seen in FIG. 6, the web 82 feeds from the roll 80 upwardly and across the surface of a guide roller 92. Turning now to FIG. 7, the lenticles 88 on the web 82 are directed toward the surface of the guide roller 92. Additionally, the guide roller is provided with a pair of spaced apart raised flange portions 94 which fit into corresponding elongated grooves 96 formed in the web 82 along the peripheral edges thereof. The interfitting of the flanges 94 and the grooves 96 assures that the web 82 will feed forwardly in a proper alignment and will prevent the web 82 from shifting laterally with respect to the guide roller 92.

Continuing with the description in FIG. 6, a pair of feed rolls 98 and 100 are disposed adjacent the guide roll 92 and serve to feed in a longitudinal direction the pictures or backing plates generally designated 102 which have the lineated image means imprinted thereon in the manner previously described. In the event that, for one reason or another, such as an objection to solvent odors, it is not desired to provide the rear surface 86 of the web 82 with micro-encapsulated adhesive, a suitable adhesive can merely be applied directly to the surface of the pictures or sheets 102, if so necessary. This alternative approach can be accomplished, for example, in the manner shown in FIG. 6 in dotted lines, by providing an adhesive reservoir 104 through which the roller 92 rotates, and by providing a doctor blade 106 to meter the thickness of the adhesive coating on the surface of the roll 98. Then, the adhesive coating will be transferred onto the underlying surface of the picture 102. Where this type of adhesive applying means is desired to be utilized, one suitable form of adhesive would be polyvinyl acetate emulsion.

As can best be seen from FIG. 8, the sheet or picture 102 has along its forward surface, the lineated image means or lineated strips which can be designated 108. The width of these strips, of course, corresponds to the width of the lenticles 88 of the web 82. On the rear surface of the sheet or picture 100, namely, that surface opposite to the surface carrying the lineated images 108, a sensing or indicating medium in the form of a dotted line or the like, designated 110, is provided along one edge of the sheet. This line 110 is parallel with the extent of the lineated images 108 and with the lenticles 88. The strip 110 is intended to pass beneath a pair of sensing photocells 112 and 114 which, in a manner to be described hereinafter, operate as a sensing mechanism to assure that the lineated strips or images means 108 on the picture 102 are always arranged in parallelism with the lenticles 88 on the web 82. It does not matter whether each lineated image strip 108 is directly behind one lenticle 88, or whether a lineated image strip extends between two lenticles. Instead, all that is required is that parallelism be maintained between the lenticles and the lineated image means.

The sheets 102 are fed forwardly in closely spaced relationship to one another and rest upon the rear surface 86 of the forwardly feeding web 82. Feed rolls 98 and 100 for the printed sheets 102 are placed such that the printed sheets 102 are normally fed onto the web 82 in a fashion such that the lineated strips or image means 108 on the picture 102 are in strict parallelism with the lenticles 88 on the web 82 and, specifically, in a fashion such that line 110 on the rear surface of the sheet or picture 102 normally will pass directly beneath both photocells 112 and 114 of the pair. However, should misalignment occur through some operating defect or the like, operation of the novel laminating machine is suspended such that poor quality 3–D units will not be inadvertently produced. To achieve this operation, reference is again directed to FIG. 8 wherein, as has already been discussed, the pair of photocells 112 and 114 are provided. Photocells 112 and 114 are preferably constructed such that they have a frequency in the ultraviolet range so as to eliminate any possible heat interference. Additionally, the photocells 112 and 114 are constructed to have an adjustable window whereby the sensitivity thereof can be varied. The outputs from both photocells 112 and 114 photocells are conducted to a differential amplifier 91 which serves to amplify any unbalance serves the output signals from the photocells and to actuate a trigger means 93 which will serve, in turn, to actuate a power switch 95 temporarily shutting down the laminating machine. If desired, a visual indication of such temporary shut down can be achieved through laminating suitable use of light bulbs or the like. As should be apparent, if the backing plate 102 upon which the image is printed and, accordingly, if the lineated image strips thereon, is in exact parallel register with the lenticles 88 of the web 82, then, line 110 will be directly beneath both photocells 112 and 114 and the outputs therefrom will be balanced. In this instance, which is the normal situation, the laminating machine would continue operation. However, if exact parallel register was not obtained through some previous malfunction in the machine, then line 110 would not be directly beneath both photocells 112 and 114 and an unbalanced signal would be generated from the differential amplifier 91 through the trigger means 93 to the power switch 95 as already discussed.

The sheets 102 now overlying the web 82 in exact parallelism therewith, are then fed through a pressure nip between a pair of rollers 116 and 118 as depicted in FIG. 6, with the size or gap of this nip being adjustable in any well known manner. When the sheets 102 and the web 82 feed through this nip, sufficient pressure is exerted to adhesively contact one against the other. In the event that the micro-encapsulated adhesive means 90 is utilized, the pressure of the rolls crushes the adhesive capsules to create a bond between the rear surface 86 of the web and its confronting surface of the picture 102. Alternatively, if the micro-encapsulated adhesive is not used and a conventional adhesive is alternatively used, such conventional adhesive being supplied by the reservoir 104, then the rolls 116 and 118 merely exert sufficient pressure to create proper adhesion. In order to prevent any excess adhesive material from contacting and fouling the surface of the roll 118, a pick-up web is provided. This pick-up web, designated 120, can be formed of wax paper and the like, and is passed from a first roll 122 across the surface of the roller 118 to be wound onto a second roll 124. As such, the sheet or web 120 tends to pick-up any excess adhesive, thereby preventing the same from becoming deposited on the surface of the roller 118.

An alternative approach is contemplated by the subject invention effecting the prevention of any excess adhesive material from contacting and fouling the pressure roll 118. If desired, the pick-up web 120 as well as its associated rolls 122 and 124 can be deleted and, instead, a novel operation of the pressure rolls 118 and 116 can be effected in its place, this operation being as follows. Initially, the pressure rollers 116 and 118 would apply pressure to the picture 102 and the underlying web 82 from a left-to-right direction as viewed in FIG. 6. When the pressure rolls 116 and 118 arrive at the trailing edge of the printed sheet 102, that is the hand portion thereof, pressure rollers 116 and 118 would stop and then subsequently reverse their direction of roll back to the initial position. In this manner, any excess adhesive between the printed sheet 102 and the web 82 would not be extruded or squeezed out. Rather, such excess adhesive would form a bead between the printed sheet 102 and the web 82 at the far right-hand side of the printed sheet 102. Such bead of adhesive would later be removed through the action of the cutting means 134 to be discussed hereinbelow.

After running through the pressure nip, a continuous conveyor means generally designated 126 is utilized to feed the now attached web and printed sheet or picture means forwardly through a heating oven 128. Suitable heating means, such as radiant heating lamps 130 are preferably disposed within the heating oven to assure that the adhesive or cement material is properly set. The heat from these lamps serves to drive off any solvent from the adhesive and any vapors are exhausted through a vent 132 in the oven. Ordinarily, the adhesive solvent utilized would be toluene or methyl ethyl ketone, or some other similar material which would readily vaporize under the application of heat.

As the web with the pictures now attached thereto feeds out of the oven 128, suitable cutting means 134 are operated, in an intermittent fashion, to sever the web between each adjacent picture 102. The severed portion creates the final 3-D product generally designated 136, and this final product can feed down a chute means 138 to some suitable form of stacking means. Any excess portion of the web can be trimmed along the edges of the final product 138 to form a finished item.

Referring now to FIG. 9, a section of the final pictorial parallax panoramagram unit is shown in greatly enlarged detail. It will be seen that the final product 136 contains a lenticular screen which is superimposed upon and adhesively bonded or attached to a backing sheet carrying a lineated image means. The lenticular screen itself is formed from the web 82 and is provided along its upper surface with the spaced parallel lenticles 88. The picture 102 has the lineated image means or lineated strips 108 directed toward the rear surface 86 of the lenticular screen, and as can be seen, the width of each lineated strip 108 corresponds with the width of each lenticle 88. While the lineated strips 108 are shown one directly behind each individual lenticle, it is, as aforementioned, not absolutely necessary that such perfect placement be achieved. Indeed, so long as the lineated image strips 108 are arranged in parallelism with the lenticles 88, it would not matter if the strips were off-set in either direction from the manner of orientation shown in FIG. 9, so that one particular strip would extend half way under two adjacent lenticles, for example. The illusion of depth which the observer receives would still be the same under such circumstances.

The illustrated final product 136 in FIG. 9 also depicts in greatly enlarged proportions, the adhesive layer designated 90a which is preferably formed through crushing of the micro-encapsulated adhesive 90, and additionally, the varnish layer 138 which is applied over the lineated image means for purpose already discussed. The thickness of layers 138 and 90a has been greatly exaggerated for purposes of illustration, but it is to be understood that in actual practice, these two layers are extremely thin so that, as a practical matter, there is very little space between the rear surface 86 of the lenticular screen and the forward surface carrying the lineated image strips 108 on the picture 102. Thus, the focal length of each individual lenticle 88 is ideally selected such that the focus will be directly upon the lineated image strips 108 behind the lenticle. While this focal length can vary slightly and still produce satisfactory results, various techniques and arrangements for obtaining the desired focal length have previously been developed in the art. For instance, reference might be had to aforementioned U.S. Pat. No. 3,241,429 and the aspheric lens arrangement described therein. Considering the final product 136 in accordance with the objective and basic aspects of the subject invention, it will be understood and appreciated that each individual lineated image strip 108 has been provided with a greater amount of parallax than was available under previously existing techniques without a sacrifice in image quality. As a result, the thickness of the lenticular screen 82 can be kept to an absolute minimum, but the observer will still experience a substantial and greatly increased illusion of depth due to the increased parallax contained in each lineated image strip 108.

As should now be apparent, the objects initially set forth at the outset of this specification, as well as further objects and advantages have now been successfully achieved.

What is claimed is:

1. A traversing camera arrangement for parallax photography comprising:
   camera means including an objective lens means, a shutter mechanism, an optical screen means having a plurality of focusing elements thereon, and film means disposed behind said optical screen means;
   excursion means for said camera means for moving said camera means along an arcuate excursion path about an object to be photographed;
   push means for effecting relative displacement between said film means and said optical screen means;
   shutter control means for opening and closing said shutter mechanism;

timing control means operable when said camera means is moving along said arcuate excursion path for periodically and synchronously actuating said shutter control means and said push means, said timing control means actuating said shutter control means and said push means only at selected sampling periods throughout the excursion path of said camera means, the relative movement between said film means and said optical screen means being in a direction opposite to the direction of camera means movement along said excursion path;

synchronizing means for synchronizing and regulating said timing control means and said excursion means with respect to one another, the summation of each relative displacement between said film means and said optical screen means throughout the entire excursion path of said camera means being substantially equal to the width of one focusing element on said optical screen means; and a magnetic brake means for disabling and restraining operation of said push means between said selected sampling periods.

2. A traversing camera arrangement for parallax photography comprising:

camera means including an objective lens means, a shutter mechanism, an optical screen means having a plurality of focusing elements thereon, and film means disposed behind said optical screen means;

excursion means for said camera means for moving said camera means along an arcuate excursion path about an object to be photographed;

push means for effecting relative displacement between said film means and said optical screen means;

shutter control means for opening and closing said shutter mechanism;

timing control means operable when said camera means is moving along said arcuate excursion path for periodically and synchronously actuating said shutter control means and said push means, said timing control means actuating said shutter control means and said push means only at selected sampling periods throughout the excursion path of said camera means, the relative movement between said film means and said optical screen means being in a direction opposite to the direction of camera means movement along said excursion path;

synchronizing means for synchronizing and regulating said timing control means and said excursion means with respect to one another, the summation of each relative displacement between said film means and said optical screen means throughout the entire excursion path of said camera means being substantially equal to the width of one focusing element on said optical screen means; and said optical screen means comprising a lenticular screen, said focusing elements thereon comprising a plurality of elongated lenticles.

3. A traversing camera arrangement as defined in claim 2, wherein the relative movement between said film means and said optical screen means is in a direction opposite to the direction of camera means movement along said excursion path.

4. A traversing camera arrangement as defined in claim 3, further including synchronizing means for synchronizing and regulating said timing control means and said excursion means with respect to one another.

5. A traversing camera as defined in claim 4, wherein said synchronizing means comprises a regulatable power supply for energizing said timing control means and said excursion means.

6. A traversing camera arrangement as defined in claim 4, wherein the summation of each relative displacement between said film means and said optical screen means throughout the entire excursion path of said camera means is substantially equal to the width of one focusing element on said optical screen means.

7. A traversing camera arrangement for parallax photography comprising:

camera means including an objective lens means, a shutter mechanism, an optical screen means having a plurality of focusing elements thereon, and film means disposed behind said optical screen means;

excursion means for said camera means for moving said camera means along an arcuate excursion path about an object to be photographed;

push means for effecting relative displacement between said film means and said optical screen means;

shutter control means for opening and closing said shutter mechanism;

timing control means operable when said camera means is moving along said arcuate excursion path for periodically and synchronously actuating said shutter control means and said push means, said timing control means actuating said shutter control means and said push means only at selected sampling periods throught the excursion path of said camera means, the relative movement between said film means and said optical screen means being in a direction opposite to the direction of the camera means movement along said excursion path;

synchronizing means for synchronizing and regulating said timing control means and said excursion means with respect to one another, the summation of each relative displacement between said film means and said optical screen means throughout the entire excursion path of said camera means being substantially equal to the width of one focusing element on said optical screen means; and said push means effecting displacement of said film means with respect to said optical screen means.

8. A traversing camera arrangement for parallax photography comprising:

camera means including an objective lens means, a shutter mechanism, an optical screen means having a plurality of focusing elements thereon, and film means disposed behind said optical screen means;

excursion means for said camera means for moving said camera means along an arcuate excursion path about an object to be photographed;

push means for effecting relative displacement between said film means and said optical screen means;

shutter control means for opening and closing said shutter mechanism;

timing control means operable when said camera means is moving along said arcuate excursion path for periodically and synchronously actuating said shutter control means and said push means, said timing control means actuating said shutter control means and said push means only at selected sampling periods throughout the excursion path of said camera means, the relative movement between said film means and said optical screen means being in a direction opposite to the direction of camera means movement along said excursion path;

synchronizing means for synchronizing and regulating said timing control means and said excursion means with respect to one another, the summation of each relative displacement between said film means and said optical screen means throughout the entire excursion path of said camera means being substantially equal to the width of one focusing element on said optical screen means; and said excursion means, said push means, and said timing control means each being adjustable.

* * * * *